United States Patent [19]
Barnes

[11] Patent Number: 6,068,789
[45] Date of Patent: May 30, 2000

[54] METHOD OF CLEANING OR PURIFYING ELASTOMERS AND ELASTOMERIC ARTICLES WHICH ARE INTENDED FOR MEDICAL OR PHARMACEUTICAL USE

[75] Inventor: Paul Barnes, King's Lynn, United Kingdom

[73] Assignee: Bespak, PLC, Norfolk, United Kingdom

[21] Appl. No.: 09/213,352

[22] Filed: Dec. 17, 1998

Related U.S. Application Data

[63] Continuation-in-part of application No. PCT/GB97/01634, Jun. 17, 1997.

[30] Foreign Application Priority Data

Jun. 18, 1996 [GB] United Kingdom .................... 9612674

[51] Int. Cl.⁷ ...................................................... C08F 6/00
[52] U.S. Cl. ........................... 252/160; 252/170; 528/495
[58] Field of Search ..................................... 252/160, 170

[56] References Cited

U.S. PATENT DOCUMENTS

| | | | |
|---|---|---|---|
| 4,680,060 | 7/1987 | Gupta et al. | 134/26 |
| 5,287,632 | 2/1994 | Heit et al. | 34/9 |
| 5,417,768 | 5/1995 | Smith et al. | 134/10 |
| 5,481,058 | 1/1996 | Blackwell et al. | 585/833 |

FOREIGN PATENT DOCUMENTS

| | | |
|---|---|---|
| 2633526 | 1/1990 | France . |
| 2638098 | 4/1990 | France . |
| 4205765 | 8/1993 | Germany . |
| 594871 | 11/1947 | United Kingdom . |
| WO 93/12161 | 6/1993 | WIPO . |
| WO 94/13733 | 6/1994 | WIPO . |
| WO 95/18834 | 6/1994 | WIPO . |

*Primary Examiner*—Terressa Mosley-Boykin
*Attorney, Agent, or Firm*—Smith, Gambrell & Russell, LLP

[57] ABSTRACT

A method of cleaning or purifying elastomers and elastomeric articles which are intended for medical or pharmaceutical use is disclosed. In particular, although not exclusively, the invention has applicability to elastomers which are used in metering valves for pressurized metered dose inhalers (MDIs).

8 Claims, No Drawings

METHOD OF CLEANING OR PURIFYING ELASTOMERS AND ELASTOMERIC ARTICLES WHICH ARE INTENDED FOR MEDICAL OR PHARMACEUTICAL USE

REFERENCE TO RELATED APPLICATIONS

This application is a continuation-in-part of international patent application serial no. PCT/GB97/01634, filed Jun. 17, 1997 which is relied upon and incorporated in its entirety and is a continuation of Great Britain patent application serial no. 9612674.3 filed Jun. 18, 1996.

This invention relates to a method of cleaning or purifying elastomers and elastomeric articles which are intended for medical or pharmaceutical use and in particular, although not exclusively, the invention has particular applicability to elastomers which are used in metering valves for pressurised metered dose inhalers (MDIs).

Pressurised metered dose inhalers were first introduced about thirty years ago for the administration of medicaments or drugs, primarily to the lungs, for the treatment of asthma and other airway diseases. Additionally, MDIs have been used for the administration of drugs to the lung for systemic absorption, for administration to the oral cavity and for administration into the nose. All of these pressurised inhalers utilise aerosol valves that meter individual doses. These metering valves are constructed of a mixture of metal and/or plastic parts and elastomeric rubbers. Various types of elastomeric rubber are used in these valves and newer types are being continually developed to ensure compatibility with the various aerosol propellants, to provide compatibility with and stability of the drug formulation and to ensure that the valve continues to perform to specification over the several years of storage required of a pharmaceutical product. One consequence of this protracted storage of aerosol packs in which the propellants are in intimate contact with the metering valve is that materials are leached or extracted from the elastomeric rubbers into the drug formulation. These materials which may be extracted from the elastomeric rubbers are a mixture of the chemical ingredients originally used to make the rubber and also new chemicals produced during the vulcanisation of the rubber. These are undesirable in the finished rubber component as they may cause instability of the formulation and/or degradation of the drug substance and therefore loss of potency, or they may impart objectionable tastes or odours to the product and could in extreme cases cause allergic or toxic reactions.

Both the pharmaceutical manufacturers and the valve manufacturers have been aware of the above problems associated with the use of elastomeric rubber compounds and various approaches have been employed to reduce the extractable chemical materials contained in the rubbers. The main approaches have been to formulate rubbers that will provide a lower level of extractable chemical materials or to pre-extract impurities from the rubbers before assembly into the metering valve. Because the final intended use of the product is for administration of drugs, the choice of extraction solvent which can be used is very limited for safety and toxicity reasons as there will remain in the rubber after solvent extraction a residue of this solvent which will be extracted into the propellant system. For this reason the most common extraction solvent used to pre-extract rubbers has been the chlorofluorocarbon Trichlorofluoromethane [$CCl_3F$] (P11) which is included as part of the propellant system in a number of MDIs. Trichlorofluoromethane has a boiling point of 23.8° C. and is often called Propellant 11 which is abbreviated to P11. Due to its boiling point the liquid can generally be used at ambient temperatures.

This pre-extraction has been carried out by a variety of methods ranging from soaking the rubbers in P11 with or without stirring, pumping the P11 through a bed of the rubber components to sophisticated custom-designed extraction apparatus where the material extracted from the rubber is continually removed and the rubber continually provided with a stream of pure P11. These methods generally take several days to achieve extraction although extraction is not complete. The processes are intended to reduce the levels of available extractable chemical materials and it is appreciated that they will not be completely eliminated.

One of the significant factors in the choice of P11 as an extracting solvent is of course that P11 has been used as a propellant in the formulations used in metered dose inhalers and therefore any residual P11 remaining in the rubber after extraction would be compatible with the pharmaceutical formulation in the MDI. However, with the advent of the newer hydrofluoroalkane (HFA) propellants as replacements for the currently used CFCs with new rubber products that had to be developed, it has been the aim to produce such rubbers with lower levels of extractable impurities. However it is impossible to completely eliminate such extractable impurities and therefore there is a continuing need for a solvent extraction process to remove such impurities from the newer rubbers, ethanol being the usual choice of extractant. However, residues of the ethanol or of whatever solvent is used will of course be left in the rubber and will be liable to leaching or diffusion into the pharmaceutical propellant composition of the MDI in which the rubber is used. The newer HFA formulations may or may not contain ethanol but for those that do not it is of course desirable to eliminate or reduce the residual ethanol in the rubbers because its extraction into the propellant composition may affect the stability of the formulation.

In the case of rubbers from which impurities have been extracted using ethanol, one method of reducing the level of ethanol is by heating the rubber to evaporate the solvent. However, this method of removal carries the risk that it may cause degradation of the rubber by oxidation and thereby render the rubber unsuitable for use in MDIs.

There is thus a continuing problem in the art to produce elastomers and elastomeric articles which are intended for medical or pharmaceutical use and which contain sufficiently low levels of extractable impurities.

According to the present invention there is provided a method of cleaning or purifying elastomers and elastomeric articles which are intended for medical or pharmaceutical use, said elastomers containing impurities comprising the chemical ingredients originally used to make the elastomer and/or new chemicals produced during vulcanisation of the elastomer, which method comprises (a) performing a first solvent extraction process on the elastomer or elastomeric article using a first solvent which is ethanol or a mixture of ethanol with water so as to substantially remove impurities from the elastomer or elastomeric article;

(b) subjecting the elastomer or article to a second solvent extraction process using a second solvent which is water used at a temperature above ambient temperature or used over a period of at least six hours to substan tially remove residues of said first solvent remaining in the elastomer or article after said first solvent extraction process said second solvent being compatible with the intended medical or pharmaceutical use of the elastomer or article and said second solvent being used at a temperature below its critical temperature; and thereafter (c) drying the elastomer or article.

The present invention is particularly applicable to the newer types of non-black rubbers which are suitable for use with the replacement hydrofluoroalkane (HFA) propellants.

The second extraction solvent is water, which can be used either static or circulated at temperatures up to its boiling point of 100° C. or as steam. It is envisaged that the most sufficient extraction would be obtained using water at a temperature of at least 78.5° C., i.e. the boiling point of ethanol, up to 100° C., or to use steam autoclaving of the rubber component using temperatures in the range of for example 100° C. to 150° C.

It should be mentioned that in the conventional one stage process of solvent extraction of impurities from rubbers intended for medical or pharmaceutical use, it is a common practice to clean the products to remove dirt, dust and other surface contaminants, for example by washing with water. It should be clearly understood however that such a subsequent washing process is not to be confused with the second solvent extraction process used in the method of the present invention in which when the second extracting solvent is water either the period of contact of the rubber with the water and/or the temperature of the treatment are likely to be significantly longer than the washing step of the prior art which is directed to the removal of surface contaminants. For example, when using water as the second extractant solvent it is preferable to use a temperature above ambient temperature and/or to carry out the extraction for a period of several hours, for example at least six hours in order to produce a significant reduction in the residue of the first extractant solvent in the rubber.

Methods of performing the present invention will be apparent to those skilled in the art, who will need little if any specific guidance on the procedures which can be adopted in order to obtain the benefits of the present invention. However, the following are some outline examples of possible ways in which the method of the present invention can be put into effect.

EXAMPLE 1

Rubber components that have been ethanol extracted are allowed to soak in distilled water for 24 hours at room temperature. The water is then drained off and the residual surface water on the components removed by a combination of spin or tumble drying and a flow of warm air up to 50° C. for 10 minutes.

EXAMPLE 2

Rubber components that have been ethanol extracted are placed in distilled water which is heated to boiling for 4 hours. The components are removed from the water and dried as in Example 1.

EXAMPLE 3

Rubber components that have been ethanol extracted are autoclaved with steam at 115° C. to 116° C. for 30 minutes and dried by the use of vacuum.

EXAMPLE 4

Rubber components that have been ethanol extracted are immersed in a HFA propellant, kept below its boiling by cooling, for 2 hours. The rubbers are then removed and the residual HFA allowed to evaporate off at room temperature.

It should be understood that the above Examples are merely illustrative and do not limit the present invention as defined in the following claims, in any way.

I claim:

1. A method of cleaning or purifying an elastomer or an elastomeric article which is intended for medical or pharmaceutical use, said elastomer or elastomeric article containing impurities comprising the chemical ingredients originally used to make the elastomer or elastomeric article and/or new chemicals produced during vulcanisation of the elastomer or elastomeric article, which method comprises:

(a) performing a first solvent extraction process on the elastomer or elastomeric article using a first solvent, wherein the first solvent is ethanol or a mixture of ethanol with water, so as to substantially remove said impurities from the elastomer or elastomeric article;

(b) subjecting the elastomer or elastomeric article to a second solvent extraction process using a second solvent, wherein the second solvent is water used at a temperature above ambient temperature or used over a period of at least six hours, so as to substantially remove residues of said first solvent remaining in the elastomer or elastomeric article after said first solvent extraction process said second solvent being compatible with an intended medical or pharmaceutical use of the elastomer or elastomeric article, and said second solvent being used at a temperature below its critical temperature; and thereafter (c) drying the elastomer or elastomeric article.

2. A method as claimed in claim 1 wherein said first solvent is an ethanol/water azeotrope.

3. A method as claimed in claim 1 wherein said second solvent is water which is used at a temperature of at least 78.5° C. up to 100° C. or steam autoclaving is used at temperatures in the range from 100° C. to 150° C.

4. A metered dose inhaler comprising including an elastomer or elastomeric article produced by the method of claim 1.

5. A method as claimed in claim 1 wherein during the second solvent extraction process, the second solvent used is water at a temperature above ambient temperature.

6. A method as claimed in claim 1 wherein the water is used during the second solvent extraction process for a period of at least six hours.

7. A method according to claim 1 wherein the second solvent is water used at a temperature of at least 78.5° C. up to 100° C.

8. A method according to claim 1 wherein the second solvent extraction process includes a steam autoclaving at temperatures in the range from 100° C. to 150° C.

* * * * *